United States Patent
Dean

(10) Patent No.: US 7,056,087 B2
(45) Date of Patent: Jun. 6, 2006

(54) TRACTION DRIVE SHAFT SEAL

(75) Inventor: W. Clark Dean, Simsbury, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 187 days.

(21) Appl. No.: 10/758,482

(22) Filed: Jan. 15, 2004

(65) Prior Publication Data

US 2005/0158166 A1 Jul. 21, 2005

(51) Int. Cl.
*F01D 11/00* (2006.01)

(52) U.S. Cl. .................. 415/171.1; 415/230; 415/231; 277/549; 384/477

(58) Field of Classification Search ............. 415/171.4, 415/174.3, 174.4, 174.5, 230–231; 277/549; 384/477
See application file for complete search history.

(56) References Cited

U.S. PATENT DOCUMENTS

| | | | |
|---|---|---|---|
| 312,171 A | 2/1885 | Shaw | |
| 2,907,611 A | * 10/1959 | Robinson | ..................... 384/477 |
| 4,024,771 A | 5/1977 | Joseph | |
| 4,489,951 A | 12/1984 | Kataoka et al. | |
| 4,700,581 A | 10/1987 | Tibbals, Jr. | |
| 4,960,405 A | 10/1990 | Katayama et al. | |
| 5,069,560 A | * 12/1991 | Niedermeier et al. | ....... 384/486 |
| 5,102,242 A | * 4/1992 | Hussblein et al. | .......... 384/523 |
| 6,036,434 A | * 3/2000 | Ray et al. | .................... 415/111 |
| 6,332,718 B1 | * 12/2001 | Tadic et al. | ................. 384/477 |

FOREIGN PATENT DOCUMENTS

| | | |
|---|---|---|
| DE | 38 33 690 | 4/1990 |
| DE | 40 38 620 | 5/1992 |
| JP | 59212574 | 12/1984 |

OTHER PUBLICATIONS

International Search Report dated Apr. 29, 2005.

* cited by examiner

*Primary Examiner*—Edward K. Look
*Assistant Examiner*—Devin Hanan
(74) *Attorney, Agent, or Firm*—Carlson, Gaskey & Olds

(57) ABSTRACT

A rotating shaft seal assembly for a shaft supported for rotation within a housing includes a traction drive rotating a seal ring about the shaft at a speed different from the shaft. The seal ring supports a plurality of seal elements rotated at the speed different from the shaft. The reduced speed of the sealing elements and reduced pressure at each seal reduces the PV level allowing the use of known sealing materials in applications otherwise not within applicable PV levels.

24 Claims, 4 Drawing Sheets

TRACTION DRIVE SHAFT SEAL

BACKGROUND OF THE INVENTION

This invention relates to a shaft seal assembly for sealing a rotating shaft penetrating a pressure barrier and specifically to a traction drive shaft seal assembly for shafts rotating at high-speeds penetrating high-pressure barriers.

In many applications, a rotating shaft penetrates a pressure barrier to rotate a vane or rotor within a pressure chamber. A potential leak point is the interface between the shaft and the pressure barrier. Sealing the shaft/pressure barrier interface is typically accomplished by selecting suitable material for a mechanical contact seal between the rotating shaft and the pressure chamber housing. Selecting the proper material for each application is dependent on a known design parameter referred to as PV. The PV for a seal is determined by multiplying a seal contact pressure (P), by a surface velocity (V) of the shaft. The specific PV value for an application is then matched to known materials to construct a suitable shaft seal.

In typical applications, the pressure and velocity of the rotating shaft allows for use of common known materials for construction of the seal. However, there are extreme applications where shaft speeds may exceed 80,000 rpm and pressures may exceed 500 psi. In such extreme applications, the PV values are such that known materials are unsuitable to adequately seal the shaft pressure barrier interface within acceptable leakage limits.

Other types of seals such as Ferromagnetic seals are not suitable for such extreme shaft speed and pressure combinations. Further, a single spring loaded carbon face seal is not acceptable because the operating speeds of the shaft and pressure within the pressure chamber combine to require a PV value greater than 30 times allowable material combinations.

Accordingly, it is desirable to develop and design a seal that can use known materials for high speed, high-pressure applications while providing a relatively low leakage.

SUMMARY OF THE INVENTION

This invention is a traction drive seal assembly for sealing a shaft/pressure barrier interface for high shaft speed and high-pressure applications by reducing the speed at which the seal rotates relative to the shaft speed and by reducing the seal contact pressure.

An embodiment of this invention is a shaft seal assembly including a seal ring having a traction ball driven by an inner traction ring and trapped between the inner traction ring and an outer traction ring. The inner traction ring rotates at the speed of the shaft. The outer traction ring is fixed to the housing and does not rotate. A traction ball trapped between the inner and outer traction rings rotates a seal ring at a speed half that of the difference in speed between the inner and outer traction rings. Accordingly, with the inner traction ring rotating at shaft speed, and the outer ring fixed, the seal ring driven by the traction ball rotates at half the shaft speed.

The seal ring includes a plurality of seals biased outwardly against inner and outer wear inserts. The seals disposed within the seal ring include a calibrated leakage providing a predetermined pressure reduction at each seal. The reduction in speed of the seal ring and the reduction of pressure at each seal lowers the PV value and allows the use of known materials in applications that would otherwise exceed capabilities of known materials.

Accordingly, the seal assembly of this invention provides a shaft seal for high speed, high pressure applications that otherwise exceed all known material capabilities using known seal materials.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
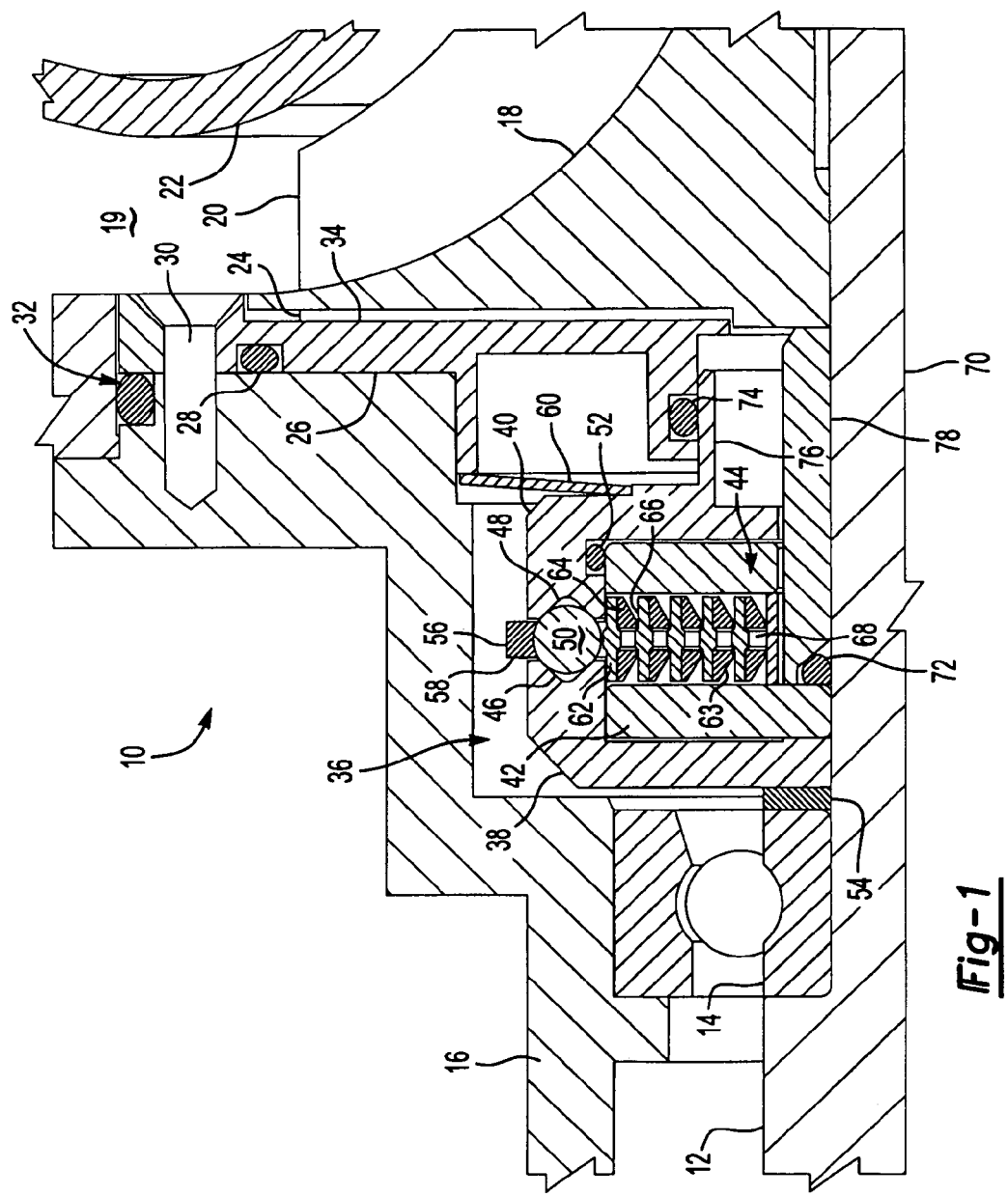
FIG. 1 is a cross-sectional view of the traction seal assembly.

Referring to FIG. 1, a compressor assembly 10 includes a housing 16 supporting a shaft 12 for rotation of a rotor 18. The shaft 12 rotates at speeds that reach 80,000 rpm and the compressor assembly 10 contains gas at a pressure that can reach 500 psi. The shaft 12 penetrates a compressor chamber 19 requiring a seal at the pressure barrier shaft interface. The PV value using the possible shaft speeds and compressor chamber pressures exceeds the capabilities of known materials. The compressor assembly therefore utilizes a traction drive seal 36 that rotates multiple sealing elements 64 at a reduced pressure and speed relative to the shaft 12, lowering the PV value and allowing the use of known materials.

The shaft 12 is supported within the housing 16 by a bearing assembly 14. Gas within the compression chamber 19 is elevated to a high pressure by rotation of the rotor 18. The rotor 18 includes compression vanes 20, to compress the gas within the compression chamber 19. A vane extension 24 extends rearward from the rotor 18. The vane extension 24 is a predetermined distance 34 from a support plate 26 to create a centrifugal field between the rotor and the seal support plate 26. The centrifugal field between the rotor 18 and the seal support plate reduces pressure incoming to the traction drive seal assembly 36. The traction drive seal assembly 36 with its multiple sealing elements 64 combined with the vane extension reduces the pressure entering the seal assembly 36. The combination of speed reduction and pressure reduction lowers the PV value, which in turn allows the use of known materials.

The seal support 26 is sealed against the shaft housing 16 by an o-ring 28 and retained by several screws 30. Further, the seal support plate 26 includes o-rings 28 and 74 and retains a seal 32 in the housing 16 to seal against leakage of gas from the compression chamber 19. The traction drive seal assembly 36 includes an inner traction ring 38 and an outer traction ring 40. The inner and outer traction rings 38, 40 include traction grooves 46, 48. The traction grooves 36, 48 trap a traction ball 50. The traction ball 50 is disposed within a hole 58 of a seal ring 56. The seal ring is driven separately from the shaft 12 by way of the traction ball 50. The seal ring 56 includes five concentric grooves 66 on both faces. Each concentric groove 66 includes a seal element 64. The seal elements 64 are biased outwardly against wear inserts 44, 42 by a biasing member 62.

The inner wear insert 42 is positioned against the inner traction ring 38 and rotates at shaft speed along with the inner traction ring 38. The outer wear insert 44 is fixed to the outer traction ring 40 and remains stationary along with the outer traction ring 40 by means of an anti rotation pin (not shown). An o-ring 52 seals the outer wear insert 44 against the outer traction ring 40.

Each seal element 64 is tapered such that the smallest portion of the seal element 64 engages the wear insert. The biasing members 62 within the concentric grooves 66 bias the sealing members 64 outwardly against the wear inserts 44, 42 with a predetermine pressure. The traction ring 56 includes openings 68 between the concentric rings to communicate pressure and gas between the faces of the traction ring 56. A biasing member 60 biases the outer traction ring 40 towards the inner traction ring 38 to maintain a constant predetermined load on the traction ball 50. Preferably, the biasing member 60 is a bevel type spring as is commonly known. Further, other biasing members as are known, such as wave washers are within the contemplation of this invention.

A sleeve 70 is provided about the shaft 12 and is sealed against the shaft 12 and the inner wear insert 42 by way of o-ring 72. The sleeve 70 transmits compression forces from the rotor 18 to the wear insert 42, traction ring 38 and bearing assembly 14. The rotor 18, sleeve 70, wear insert 42, spacer 54 and bearing assembly 14 are all held on the shaft and rotated with the shaft. The rotor 18, sleeve 70, wear insert 42, spacer 54 and bearing assembly 14 of components are held in place by a nut and washer attached to a distal end of the rotating shaft 12. These items are not shown in the drawings but are as known to a worker skilled in the art, and other means of securing elements to a rotating shaft are within the scope of this invention.

The traction drive assembly 36 incorporates the traction groove 46 and 48 in an inner traction ring 38 and an outer traction ring 40 and a traction ball 50. The seal ring 56 includes a hole 58 in which the traction ball 50 rotates. This view illustrates one traction ball 50, preferably, at least four traction balls 50 will be disposed about the shaft 12 within corresponding holes 58 in the seal ring 56.

The traction ball 50 is in rotational contact with both the inner and outer traction rings 38, 40. The inner traction ring 38 rotates at the speed of the shaft 12 and the outer traction ring 40 is fixed. The traction ball 50 rotates at half the speed of the difference between the speeds of the inner traction ring and the outer traction ring. The seal ring 56 is driven to rotate about the shaft 12 by the traction ball 50. Because the traction ball 50 is rotating at half the speed of the shaft 12, the seal ring 56 is also rotating at half shaft speed. Therefore, the sealing elements 64 disposed within the concentric rings 66 of the seal ring 56 are rotating at half shaft speed. The reduction of speed and pressure at the sealing elements 64 allows the use of known materials within designed PV values. As appreciated, the reduced speed and pressure at the seal ring 56 reduces the PV value at each seal element 64 to acceptable values, providing for the use of known sealing materials.

Figure 2:
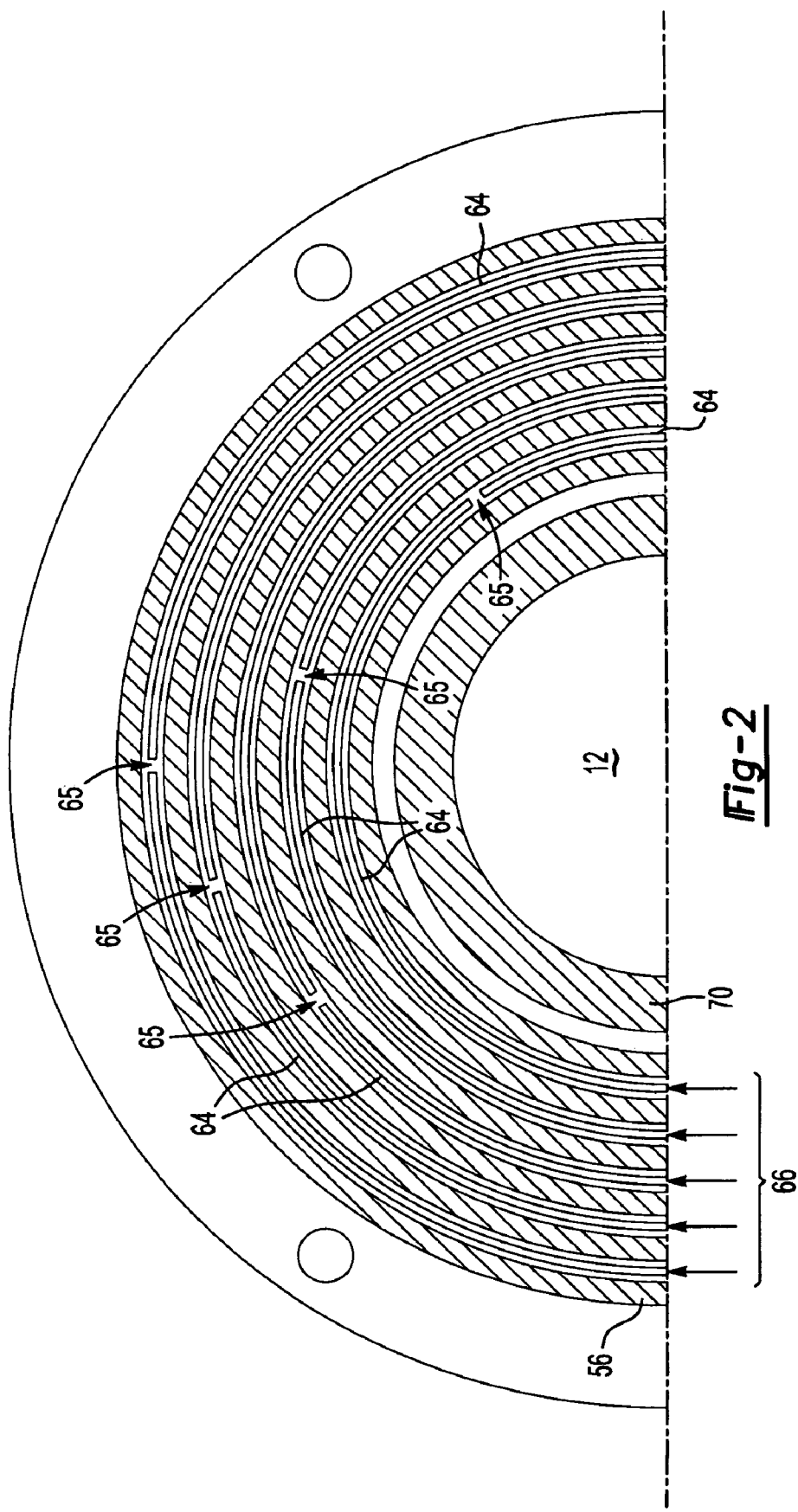
FIG. 2, is a cross-sectional view through the seal ring.

Referring to FIGS. 1 and 2, the seal assembly 36 includes two parallel dynamic sealing leakage paths along each face of the sealing ring 56 for gas escaping the compression chamber 19. Each path is sealed with five sealing elements 64 placed in series. Each sealing element 64 is supported within the concentric grooves 66 of the seal ring 56. The sealing element 64 includes a split 65 in the seal element 64 and the sealing element is radially outwardly biased such that a predetermined amount of load is exerted radially by the seal element 64 against the concentric grooves 66.

The width of the split 65 of the installed sealing element ranges from 0.005 inches at an innermost seal ring to 0.015 inches at the outermost sealing element 64. The seal elements 64 extend from the seal ring 56 to engage the wear inserts 42, 44. A clearance between the wear inserts 42, 44 and the seal ring 56 is present. The size of each split 65 combined with the clearance between the seal ring 56 and the wear inserts 42, 44 create an flow path through which passes a small amount of leakage past each seal element 64. This calibrated leakages produces a cascading reduction in pressure that presents $\frac{1}{5}^{th}$ of the total pressure difference at each seal element 64. The reduction in pressure results in the pressure induced seal contact force being only $\frac{1}{5}^{th}$ that on each seal element 64 that would result from the use of a single seal element 64.

The tapered edges 63 of the sealing elements 64 reduce the contact area between the seal element and the wear inserts 42, 44. The difference between the frictional forces caused by contact between the seal elements 64 and the wear inserts 42, 44 must be overcome by the traction ball 50 in order to drive the seal ring 56. The reduced contact area provided by the tapered edges 63 of the sealing elements 64 reduces the amount of friction that must be overcome by the traction ball 50 and reduces frictional heating in the seal assembly.

The combined effect of the vanes 24 on the back of the rotor 18 and the calibrated leakage through the slits 65 of the five seals in series provides a reduction in pressure at the seal elements 64. Further, the reduced speed at which the seal elements 64 rotate provided by the traction ball 50 reduces the PV level by a factor of 25 for each seal. The reduction in PV values allows the use of known materials within design capability limits.

Figure 3:
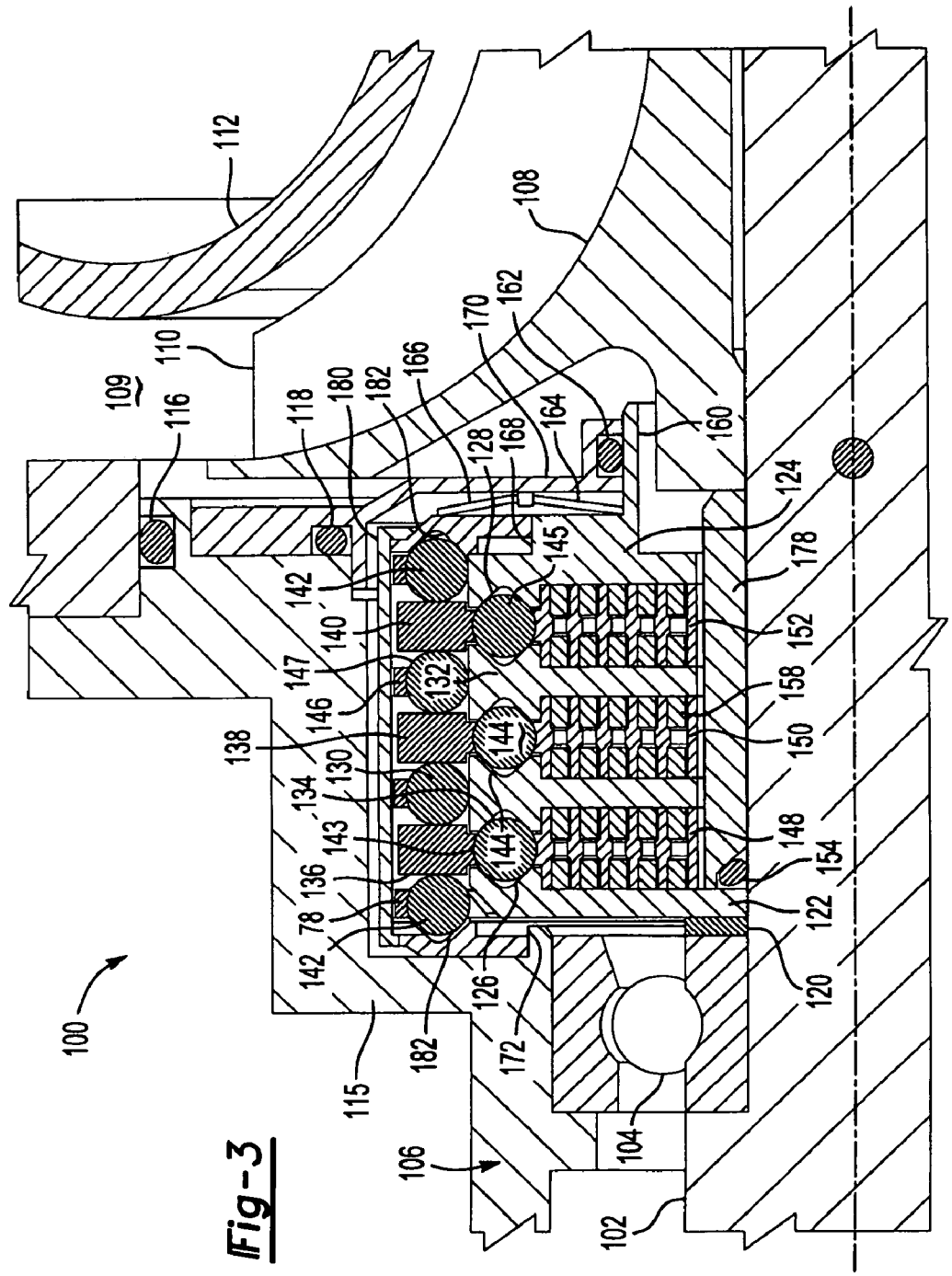
FIG. 3 is another embodiment of a traction seal assembly.
Figure 4:
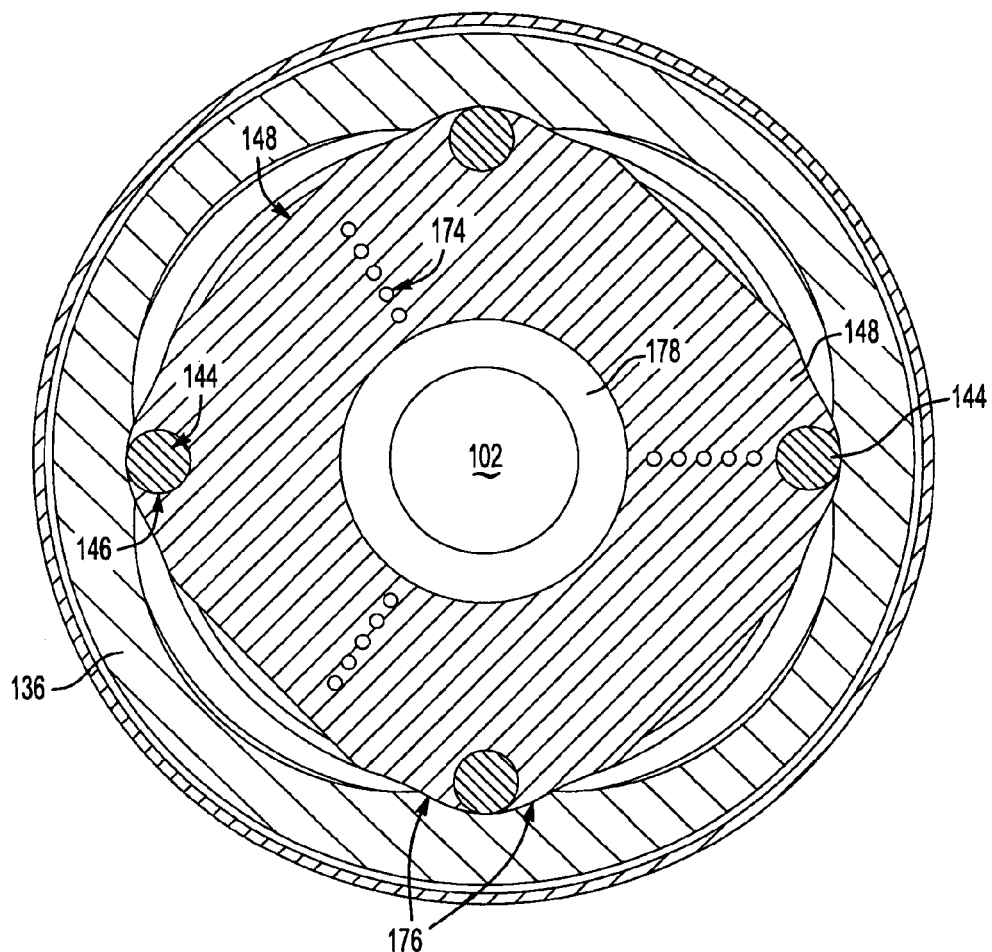
FIG. 4 is a cross-sectional view of the traction seal assembly of FIG. 3 perpendicular to the axis of rotation of the shaft.

Referring to FIGS. 3 and 4, another embodiment of the compressor assembly is generally indicated at 100 and includes a shaft 102 supported by a bearing assembly 104 within the housing 106. A rotor 108 is rotated by the shaft 102 to compress a volume of gas within a compressor chamber 109. In this embodiment, the rotor 108 does not include the vane extension 24 (FIG. 1). Therefore, pressure is not reduced before entering the traction seal assembly 115. For this reason, multiple sealing rings 148, 150, 152 are placed in parallel and driven at a reduced speed relative to the shaft 102.

The traction drive seal assembly 115 is installed between the rotor 108 and the bearing assembly 104. A contact spacer 120 is held in place between an inner traction ring 122 and the bearing assembly 104. A sleeve 178 transmits a compression force from the rotor 108 to the inner traction ring 122 to hold the seal assembly 115 in place on the shaft 102. An o-ring seal 154 seals against the shaft 102. The sleeve 178 seal 154, inner traction ring 122 and spacer 120 rotate with the shaft 102. Compression on this stack of component is provided by a known nut and washer configuration attached to the shaft 102.

The outer traction ring 124 does not rotate with the shaft 102. Biasing member 164 places a load on the outer traction ring to maintain a desired load on traction balls 143, 144, and 145. Biasing member 166 places a load on thrust race 182, thrust balls 142, and traction balls 141, 147 of the seal assembly 115. The biasing members 164 and 166 are backed by the support plate 170. The support plate 170 includes seals 118, and 162 to seal against leakage. Seals 118 and 162 are static seals such that neither of the sealed surfaces moves relative to each other. An inlet housing 112 within the compression chamber 109 seals against the housing 106 by way of seal 116.

The traction drive seal assembly 115 contains three seal rings 148, 150 and 152 including multiple seal elements 158. The traction balls 143,144 and 145 are held within a groove 146 (FIG. 4) of each seal ring 148, 150 and 152.

As appreciated, the outer traction ring 124 is fixed relative to the housing 106 and does not rotate, whereas the inner traction ring 122 rotates at the speed of the shaft 102. Intermediate traction rings 130 and 132 are disposed between the inner and outer 122, 124 traction rings. Between each traction ring are the seal rings 148, 150, 152. Each traction ball 143,144, and 145 disposed within the seal rings 148, 150, 152 drives one of the drive rings 136,138,140 disposed about each seal ring 148,150,152. Because the seal assembly 115 uses multiple seal rings 148,150, and 152, drive rings 136,138 and 140 are required to ensure that each seal ring 148, 150 and 152 rotates relative to the shaft 102. Without the drive rings 136,138 and 140 frictional forces would govern the speed of each seal ring 148, 150, 152. With the drive rings 136, 138 and 140, the specific reduction of speed between each seal ring 148, 150 and 152 is controlled.

The drive ring 136 is driven by rotation of the first traction ball 143. The inner traction ring 122 centers the seal rings 148, 150, 152 about the shaft 102 and includes the traction groove 126 that cooperates with a second traction groove 134 disposed on the first intermediate ring 130. The drive rings 136, 138, 140 positioned around each seal ring 148, 150, 152 and are driven by the traction balls 143,144 and 145. Radial positioning of each drive ring 136, 138, 140 is provided by contact with the surface of the traction balls 143,144 and 145. The traction balls 143,144 and 145 represent one of four balls held within the seal rings 148, 150 and 152 about the shaft 102.

A traction ball 141,145 is positioned between each drive ring 136,138 and 140. The thrust balls at each end 142 merely transmit a thrust force to maintain alignment and proper preload on the traction balls 141 and 147 disposed between drive rings 136, 138 and 140. The thrust balls 142 are radially positioned by a cage 78 and axially supported by a thrust race 182 positioned at each end of the seal assembly 115. A retaining cylinder 180 maintains all of the elements of the seal assembly 115 in proper position during assembly into the housing 106. The drive rings 136,138 and 140 are driven by the thrust balls 144 and in turn, drive the next thrust ball which in turn drives one of the intermediate traction rings 130 and 132 to control the speed of the sealing rings 148, 150 and 152 relative to the speed of the shaft.

As appreciated in this embodiment, three sealing rings 148,150, and 152 are shown, however it is within the contemplation of this invention that as many or as few sealing rings as are required to provide the proper and desired speed reduction and in order to reduce the PV value are within the contemplation of this invention.

Each traction ball 143,144, 145,141 and 147 rotate at a speed that is half the difference in speed of the surrounding surfaces. For each traction ball 143,144, 145, 141 and 147, the speed at which the ball drives the next member is half the difference between rotating surfaces. The traction balls 143,144, 145 frictionally engage and rotate the drive rings 136,138,140.

In operation, the inner traction ring 122 is rotating at shaft speed and the first intermediate traction ring 130 is rotating at $2/3^{rd}$ shaft speed. The seal ring 148 and drive ring 136 rotate at half the difference in speeds and are therefore rotating at $5/6^{th}$ the shaft speed. The thrust ball 141 is rotated between the first drive ring 136, rotating at $5/6^{th}$ shaft speed and the second drive ring 138 rotating at $1/2$ shaft speed. The thrust ball 141 drives the first intermediate traction ring 130 at $2/3^{rd}$ shaft speed.

The second seal ring 150 is driven by the traction ball 144 between the first intermediate traction ring 130 rotating at $2/3^{rd}$ shaft speed and a second intermediate traction ring 132 rotating at $1/3^{rd}$ shaft speed. The traction ball 144 therefore rotates about the shaft 102 at $1/2$ shaft speed. The traction ball 144 drives the drive ring 138 at $1/2$ shaft speed. The thrust ball 147 rotates between the second drive ring 138 rotating at $1/2$ shaft speed and the third drive ring 140 rotating at $1/6^{th}$ shaft speed. Therefore, the second intermediate traction ring 132 driven by the thrust ball 147 rotates at $1/3$ shaft speed. The third seal ring 152 is driven by the traction ball 145 rotating between the second intermediate traction ring 132 rotating at $1/3^{rd}$ shaft speed and the fixed outer traction ring 124. Therefore, the seal ring rotates at $1/6^{th}$ shaft speed. The resulting relative motion of seal elements 158 on the sealing surfaces of traction rings is that each sealing element 158 is rotating at $1/6$ of the shaft speed.

Further, each seal element 158 positioned in the seal ring 148, 150 and 152 includes the slits as shown and described in the previous embodiment to reduce the. This resulting calibrated leakage produces a cascading reduction in pressure that presents $1/5^{th}$ of the total pressure difference at each seal element 158. The reduction in pressure results in the pressure induced seal contact force being only $1/5^{th}$ that on each seal element 158 that would result from the use of a single seal element. This is magnified by the use of three seal rings 148, 150, 152.

The combined effect of operating and rotating the seal elements 158 at $1/6$ the operating speed and $1/5$ of the operating pressure reduces the overall PV by 30 times that which would be required with current seals. This reduction makes known seal materials such as filled carbon seal rings running on silicone carbide sealing surfaces capable of operation at a combined speed and pressure loading 30 times higher than would otherwise be possible.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A rotating shaft seal assembly comprising:
   a shaft supported for rotation within a housing;
   a traction drive rotating a seal ring about said shaft at a speed different than said shaft, wherein said traction drive includes a traction ball supported by said seal ring and driven by said traction drive; and
   a plurality of seal elements supported by said seal ring, wherein each of said plurality of seal elements includes a flow path generating a desired pressure change across each of said plurality of seal elements.

2. The assembly of claim 1, wherein said traction drive includes an inner traction ring rotating with said shaft, an outer traction ring fixed to said housing, and the traction ball supported by said seal ring and driven by said inner traction ring.

3. The assembly of claim 2, wherein said inner and outer traction rings include traction grooves, and said traction ball is supported within said traction grooves.

4. A rotating shaft seal assembly comprising:
a shaft supported for rotation within a housing;
a traction drive rotating a seal ring about said shaft at a speed different than said shaft, wherein said traction drive includes a traction ball supported by said seal ring and driven by said traction drive;
a plurality of seal elements supported by said seal ring;
an inner seal wear insert rotating with said shaft; and
an outer seal wear insert fixed to said outer traction ring.

5. The assembly of claim 1, wherein said seal ring includes a plurality of concentric grooves and said plurality of seal elements are disposed within said grooves.

6. The assembly of claim 5, wherein said concentric grooves are disposed on opposing faces of said seal ring.

7. The assembly of claim 6, including a biasing member within each concentric groove for biasing said seal elements against one of said inner and outer seal wear inserts.

8. A rotating shaft seal assembly comprising:
a shaft supported for rotation within a housing;
a traction drive rotating a seal ring about said shaft at a speed different than said shaft, wherein said traction drive includes a traction ball supported by said seal ring and driven by said traction drive; and
a plurality of seal elements supported by said seal ring, wherein each of said plurality of seal elements includes an opening to allow a predetermined amount of leakage.

9. The assembly of claim 8, wherein said seal ring includes a first and second face and five concentric rings are disposed on each of said first and second faces, and a seal assembly is disposed in each of said concentric rings and is biased into sealing engagement with one of an inner and outer wear inserts.

10. The assembly of claim 8, wherein said opening in each of said seal elements is different to provide a calibrated amount of leakage.

11. A rotating shaft seal assembly comprising:
a shaft supported for rotation within a housing;
a traction drive rotating a seal ring about said shaft at a speed different than said shaft, wherein said traction drive includes a traction ball supported by said seal ring and driven by said traction drive;
a plurality of seal elements supported by said seal ring; and
a preload biasing member biasing said outer traction ring toward said inner traction ring to provide a desired amount of contact pressure on said traction ball.

12. A rotating shaft seal assembly comprising:
a shaft supported for rotation within a housing;
a traction drive rotating a seal ring about said shaft at a speed different than said shaft, wherein said traction drive includes a traction ball supported by said seal ring and driven by said traction drive;
a plurality of seal elements supported by said seal ring; and
an intermediate traction ring, an intermediate traction ball, and an intermediate seal ring disposed between said inner and outer traction rings.

13. The assembly of claim 12, including a first drive ring rotating about said seal ring and driven by said traction ball.

14. The assembly of claim 12, including a second drive ring and a thrust ball disposed between said first and second drive rings, said thrust ball driving said intermediate seal ring.

15. The assembly of claim 12, including a plurality of intermediate seal rings, along with a plurality of thrust balls, wherein each of said seal rings rotates at a fraction of said shaft speed.

16. A compressor assembly comprising:
a shaft supported for rotation within a housing;
a rotor driven by said shaft within a compressor chamber, said rotor including a compression vane and a vane extension extending from a rear portion of said compression vane;
a traction drive supported about said shaft and rotating at a speed different than said shaft, and
a seal ring supporting a plurality of seal elements driven about said shaft by said traction drive, wherein each of said plurality of seal elements include a flow path for generating a desired pressure change between said plurality of seal elements.

17. The assembly of claim 16, wherein said vane extensions produce a centrifugal field between said housing and said rear portion of said compression vane, said centrifugal field between said housing and said rear portion of said compression vane to reduce pressure of gas traveling toward said shaft.

18. The assembly of claim 16, wherein said traction drive includes an inner traction ring rotating with said shaft, an outer traction ring fixed to said housing, and a traction ball supported by said seal ring and driven by said inner traction ring.

19. A compressor assembly comprising:
a shaft supported for rotation within a housing;
a rotor driven by said shaft within a compressor chamber, said rotor including a compression vane and a vane extension extending from a rear portion of said compression vane, wherein said vane extensions produce a centrifugal field between said housing and said rear portion of said compression vane, said centrifugal field between said housing and said rear portion of said compression vane to reduce pressure of gas traveling toward said shaft;
a traction drive supported about said shaft and rotating at a speed different than said shaft, wherein said traction drive includes an inner traction ring rotating with said shaft, an outer traction ring fixed to said housing, and a traction ball supported by said seal ring and driven by said inner traction ring, and
a seal ring supporting a plurality of seal elements driven about said shaft by said traction drive;
an inner seal wear insert rotating with said shaft; and
an outer seal wear insert fixed to said outer traction ring.

20. The assembly of claim 19, wherein said seal ring includes a first and second face and five concentric rings are disposed on each of said first and second faces, and a seal assembly is disposed in each of said concentric rings and is biased into sealing engagement with one of said inner and outer wear inserts.

21. The assembly of claim 20, wherein each of said seal elements includes an opening, said openings in said seal elements allow a calibrated amount of leakage through said seal.

22. The assembly of claim 21, including an intermediate traction ring, an intermediate traction ball, and an intermediate seal ring disposed between said inner and outer traction rings and a first drive ring rotating about said seal ring and driven by said traction ball.

23. The assembly of claim 22, including a second drive ring and a thrust ball disposed between said first and second drive rings, said thrust ball driving said intermediate seal ring.

24. The assembly of claim 22, including a plurality of intermediate seal rings, along with a plurality of thrust balls, wherein each of said seal rings rotates at a fraction of said shaft speed.

* * * * *